United States Patent [19]

Leslie et al.

[11] Patent Number: 5,474,168
[45] Date of Patent: Dec. 12, 1995

[54] STACKING APPARATUS AND METHOD THAT REORIENTS PRODUCT UNITS ALONG A GENERALLY HELICAL LINE WHILE BEING CONVEYED FROM A LOADING STATION TO AN UNLOADING STATION

[75] Inventors: Wayne G. Leslie; Larry V. Dalton, both of Cincinnati, Ohio

[73] Assignee: The Procter & Gamble Company, Cincinnati, Ohio

[21] Appl. No.: 382,830

[22] Filed: Feb. 3, 1995

Related U.S. Application Data

[63] Continuation of Ser. No. 992,987, Dec. 18, 1992, abandoned.

[51] Int. Cl.[6] ................................... B65G 19/02
[52] U.S. Cl. ............................. 198/484.1; 198/803.13; 414/798.7
[58] Field of Search ...................... 198/412, 426, 198/484.1, 732, 803.13; 414/798.7, 786

[56] References Cited

U.S. PATENT DOCUMENTS

| | | | |
|---|---|---|---|
| 2,733,806 | 2/1956 | Lanier, Jr. | 198/139 |
| 2,952,567 | 9/1960 | Nordquist et al. | 198/412 X |
| 3,169,631 | 2/1965 | Knappe | 198/187 |
| 4,223,779 | 9/1980 | Hopkins | 198/426 |
| 4,399,905 | 8/1983 | Lance et al. | 198/422 |
| 4,437,562 | 3/1984 | Koppers et al. | 198/733 |
| 4,461,378 | 7/1984 | Roth | 198/365 |
| 4,577,453 | 3/1986 | Hofeler | 53/438 |
| 4,751,997 | 6/1988 | Hirsch | 198/407 |
| 4,768,642 | 9/1988 | Hunter | 198/484.1 X |
| 4,838,410 | 6/1989 | Gough | 198/706 |
| 5,127,209 | 7/1992 | Hunter | 198/484.1 X |
| 5,157,894 | 10/1992 | Mini et al. | 53/148 |

FOREIGN PATENT DOCUMENTS 2124574  2/1984  United Kingdom .

*Primary Examiner*—Michael S. Huppert
*Assistant Examiner*—Janice L. Krizek
*Attorney, Agent, or Firm*—Michael E. Hilton; Dean L. Garner; Michael J. D'Amelio

[57] ABSTRACT

A method and apparatus for stacking and conveying product units. The product units are conveyed on a conveyor from a loading station to an unloading station. The conveyor has a number of paddles extending therefrom where adjacent paddles define receptacles between them for holding the product units. The invention allows the products to be reoriented while being conveyed from the loading station to the unloading station so that the products arrive at the unloading station with the desired orientation. This eliminates separate steps and apparatuses for conveying and reorienting. The present invention does this by first loading at least one product unit into the product receptacles and conveying the product units along the longitudinal axis of the conveyor. The paddles are then reoriented along a generally helical line while the products are being conveyed from the loading station to the unloading station. The paddles are reoriented to a desired angle with respect to the longitudinal axis of the conveyor. The product units are unloaded at the unloading station as a stack by removing the product units from a plurality of product receptacles. The paddles are then reoriented and returned to their original position as when they were loaded.

11 Claims, 6 Drawing Sheets

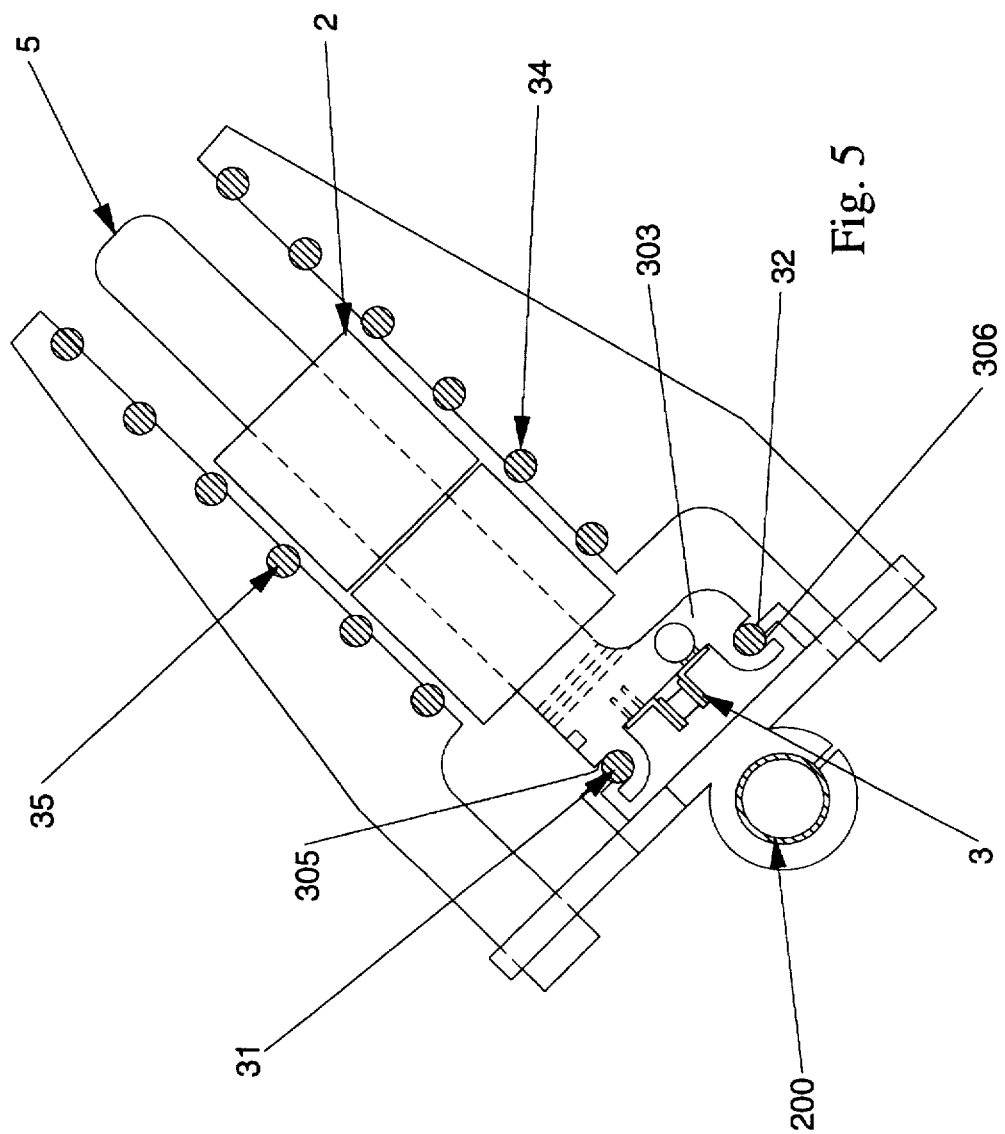

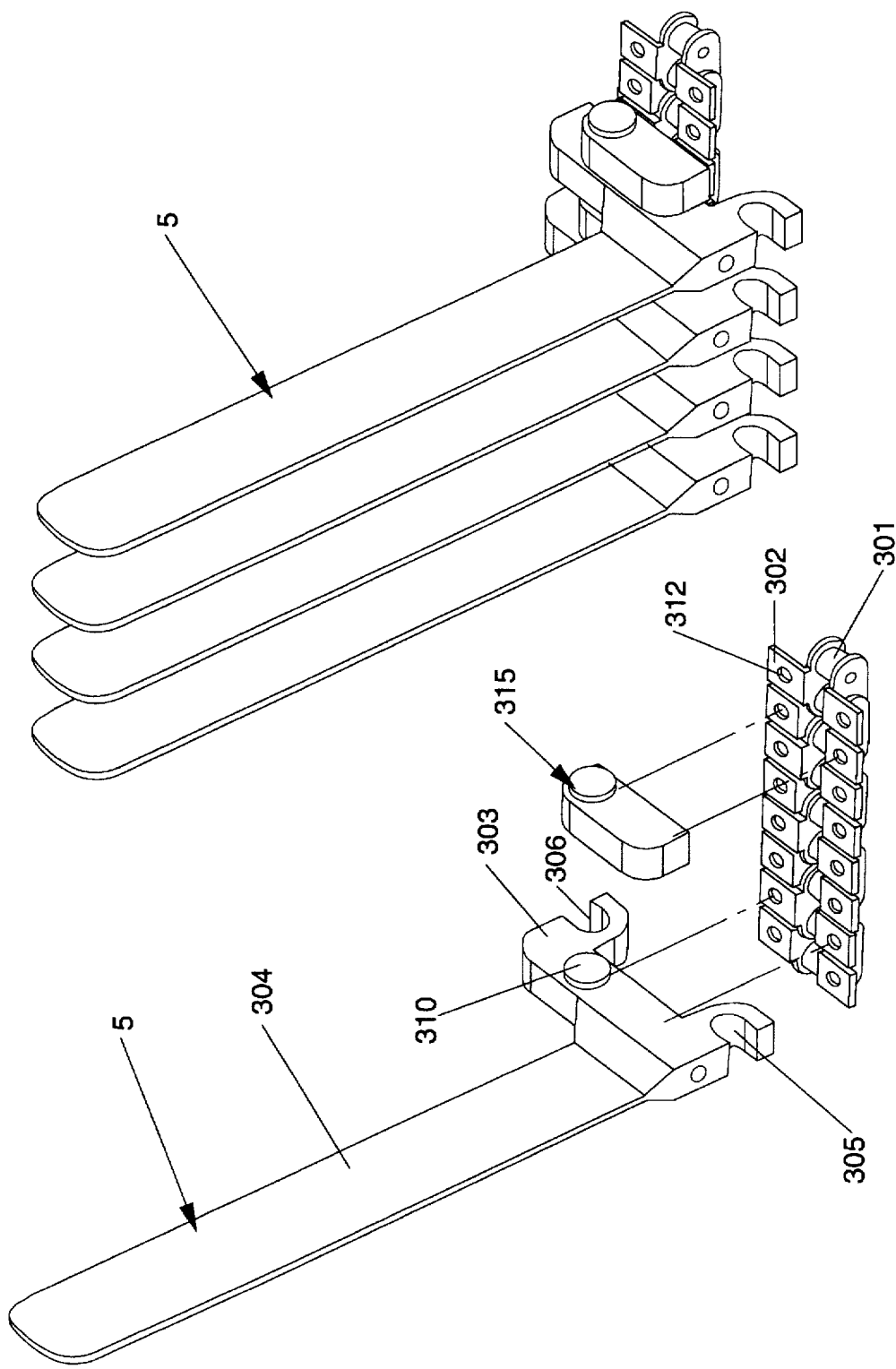

5,474,168

STACKING APPARATUS AND METHOD THAT REORIENTS PRODUCT UNITS ALONG A GENERALLY HELICAL LINE WHILE BEING CONVEYED FROM A LOADING STATION TO AN UNLOADING STATION

This is a continuation of application Ser. No. 07/992,987, filed on Dec. 18, 1992, now abandoned.

FIELD OF THE INVENTION

The present invention relates to a method and apparatus for collating and/or stacking articles such as consumer products. More specifically the invention relates to a stacking/collating apparatus capable of receiving an article in one plane and re-orienting along a helical line into another plane while it is being conveyed.

BACKGROUND OF THE INVENTION

Consumer products such as catamenials, diapers, packaged food etc. are often placed in rows of one or more units, whereby one or more rows are then stacked on top of or next to each other before being packaged in a box, carton, bag or other type of container. There are many types of apparatuses for forming stacks of articles, such as consumer products, and forwarding the articles to a position where they are unloaded as a stack so as to be bagged or otherwise further packaged. Examples of such apparatuses that are well known in the art are shown in commonly assigned U.S. Pat. Nos. 4,399,905 issued to Lance et al. on Aug. 23, 1983 and 4,577,453 issued to Hofeler on Mar. 25, 1986, both of which are hereby incorporated herein by reference.

Apparatuses of the type described in the above mentioned references typically load the products at an infeed or loading station, transfer the products to an outfeed or unloading station where a stack of products is unloaded. The stack is then placed into a large rotary turret which indexes or rotates the stack typically 90°. This reorientation of the stack is usually done for rectangular stacks. This is because the stack products at the outfeed station of the apparatus has its longer sides positioned vertically, which is not the correct orientation required in order for the stack to be placed in a bagger or the like. The stack needs to be reoriented 90°, i.e. placed on its side, in order for it to be in the proper position to be bagged or otherwise further packaged. This is because most commercial baggers only handle stacks in a rectangular opening with the longer sides positioned horizontally. Moreover, the stack has greater stability when placed on its side which facilitates easier placement into a bagger or the like.

However, the above described method has its drawbacks. The placing of the stack into the turret requires the extra steps of transferring the stack from the stacking apparatus to the turret, rotary indexing the turret, stripping of the stack from the turret, and then conveying the stack to the infeed of a bagger. Because so many steps are involved, production is slowed down, resulting in increased manufacturing costs and eventual increase in final costs to the consumer.

A solution, well known in the art, for eliminating the use of a rotary turret is to take an apparatus of the type generally described above and turn it on its side so that it is horizontal. This causes the products to arrive at the outfeed or unloading station with the correct orientation and eliminates the need to use a rotary turret or the like. However, because the infeed or loading station is also in a horizontal position, the products have to be reoriented before they are placed into the stacking apparatus. This is usually accomplished by placing the product units into a pair of twist belts which reorient the product and then deliver it to the loading station.

However, this type of apparatus and method does not reduce the number of steps involved from taking the product from a production line, loading the product into the infeed of the apparatus and the unloading of the stack, with the correct orientation, at a bagger or the like. Because the product has to placed into and removed from the twist belts, the number of steps involved in the process is not reduced. Additional product transfer steps, before and after reorientation, where the product needs to be transferred to a separate reorienting device, whether a pair of twist belts or a rotary turret, causes many problems and has many disadvantages. Additional product transfer steps increase the chances of product mishandling causing manufacturing errors to occur on the line. This results in the line having to be shut down in order to correct the error, which costs time and money thereby increasing the final cost of the product to the consumer. Moreover, when using twist belts it is difficult to load more than one product unit into the apparatus at a time. The twist belts are not well adapted to handling a row of multiple products, and attempts to do so often results in a jam occurring on the line.

There has therefore been a need to provide a method for stacking, conveying and reorienting product units, which come off a production line with an incorrect orientation for any further manipulation, that requires fewer steps than the prior art methods. There has also been a need to provide an apparatus for stacking and conveying product units which is also capable of reorienting the product units, thereby eliminating the need to employ a separate apparatus for doing so.

It is therefore an object of the present invention to provide a stacking apparatus and method wherein the products are reoriented while being transferred from a loading station to an unloading station without any intermediate steps, product transfers or additional apparatuses.

It is another object of the present invention to provide such a stacking apparatus and method wherein after the product has been re-oriented it can be stripped directly from the apparatus into a packager, bagger or the like, so as to increase speed and raise efficiency.

The aforementioned and other objects of the present invention will become more apparent hereinafter.

SUMMARY OF THE INVENTION

In accordance with the present invention there is provided a method for stacking and conveying product units. The units are conveyed on an endless conveyor from a loading station to an unloading station. The conveyor includes a plurality of paddles extending therefrom. Adjacent paddles define product receptacles therebetween. The method allows the products to be reoriented while being conveyed so that the products arrive at the unloading station with the desired orientation. This eliminates separate steps for conveying and reorienting.

The method of the present invention includes the steps of loading at least one product unit into the product receptacles and conveying the product units along the longitudinal axis of the conveyor. The paddles are then reoriented along a generally helical line while the products are being conveyed. The paddles are reoriented to a desired angle with respect to the longitudinal axis of the conveyor. The product units are unloaded at the unloading station as a stack by removing the product units from a plurality of product receptacles. The paddles are then reoriented and returned to their original position as when they were loaded.

In accordance with another aspect of the present invention there is provided an apparatus for stacking and conveying product units. The product units are conveyed from a loading station to an unloading station. The apparatus reorients the products while they are being conveyed so that stacks of product units arrive at the unloading station with the correct orientation. This eliminates the need for separate apparatuses for conveying and reorienting.

The apparatus includes an endless conveyor having a plurality of paddles extending therefrom. Adjacent paddles define product receptacles therebetween. A means is provided for reorienting said paddles along a generally helical line while the products are being conveyed from the loading to the unloading station. The paddles are reoriented to a desired angle with respect to the longitudinal axis of the conveyor. Lastly, a means is provided for reorienting and returning the paddles from the unloading station back to their original position at the loading station.

BRIEF DESCRIPTION OF THE DRAWINGS

FIG. 5 is a cross-sectional view of a preferred embodiment of the apparatus of the present invention taken parallel to paddles 5 at a point along the first means 30 for reorienting the paddles along a helical line and looking upstream.

FIG. 6 is a simplified exploded view of a preferred embodiment for the conveyor of the present invention.

FIG. 7 is a simplified perspective view of a preferred embodiment of the conveyor of the present invention.

DETAILED DESCRIPTION OF THE INVENTION

Figure 1:
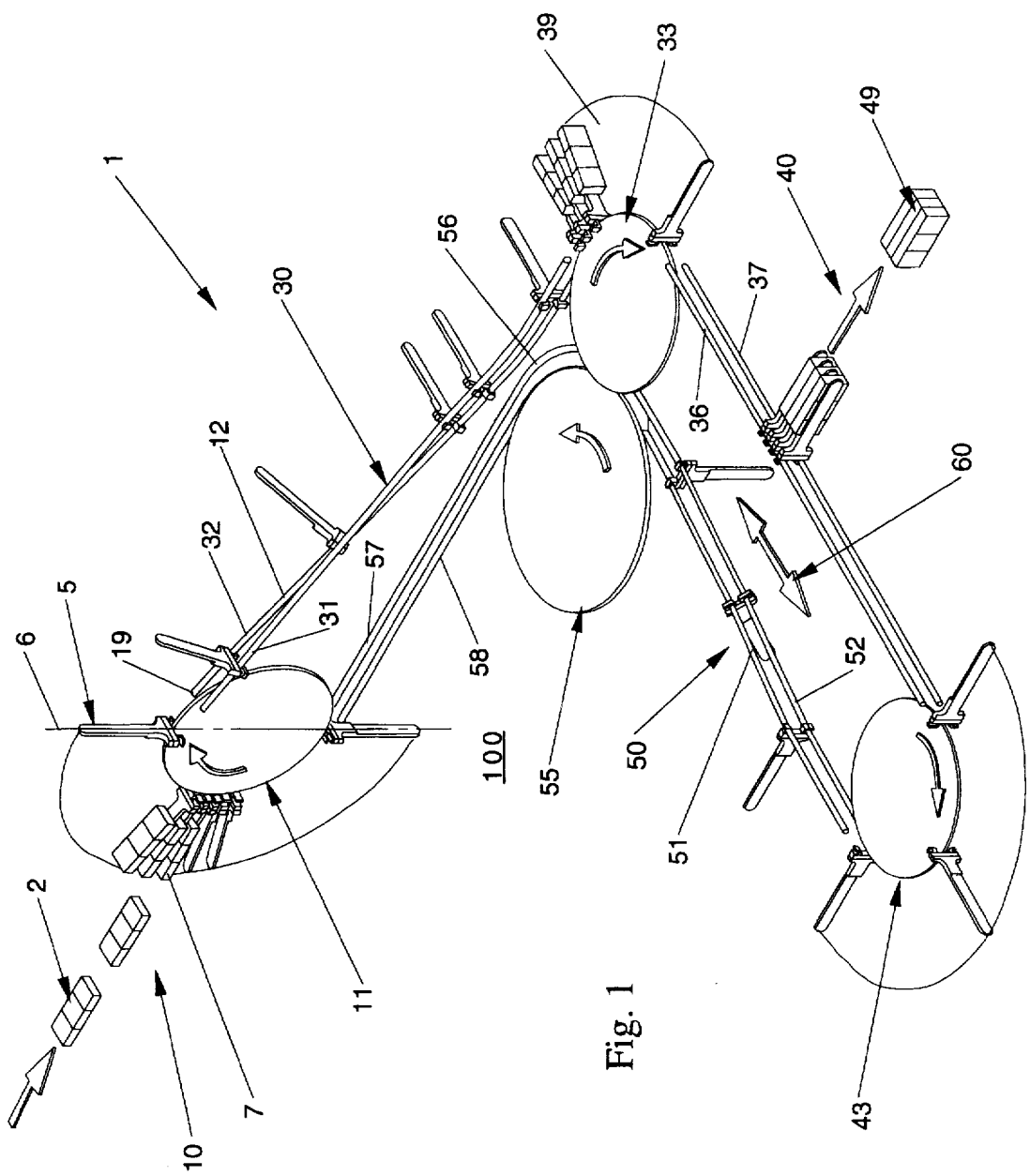
FIG. 1 is a simplified perspective view of a preferred embodiment of the present invention, wherein for clarity not all of the paddles 5 are shown.

Referring now to the drawings in detail wherein like numerals indicate the same element throughout the views there is shown in FIG. 1 a simplified perspective view of an apparatus 1 for stacking consumer product units 2. Apparatus 1 comprises an endless conveyor 3, shown in FIG. 7. In a preferred embodiment conveyor 3 is a twist chain. Conveyor 3 has a plurality of paddles 5 extending therefrom. In a preferred embodiment paddles 5 of conveyor 3 are substantially equally spaced and are generally planar having their vertical axis 6 extending outwardly from and generally perpendicular to the longitudinal axis of conveyor 3. The longitudinal axis of conveyor being defined as the axis parallel to the direction of travel. Adjacent paddles define product receptacles or pockets 7 therebetween. Apparatus 1 further includes a loading station 10, a first means 30 for reorienting the paddles along a helical line, and a discharge station 40. The method of the present invention can best be understood by describing the preferred embodiment of the apparatus. Briefly, however, the method involves loading at least one product unit 2 into a product receptacle 7 and conveying the product along the longitudinal axis of the conveyor 3. The paddles 5 are then reoriented along a helical line to a desired angle with respect to the longitudinal axis of the conveyor. A stack of products is then unloaded from the apparatus by removing product units from a plurality of product receptacles. The paddles are then reoriented and returned from the unloading station to their original position at the loading station.

Figure 2:
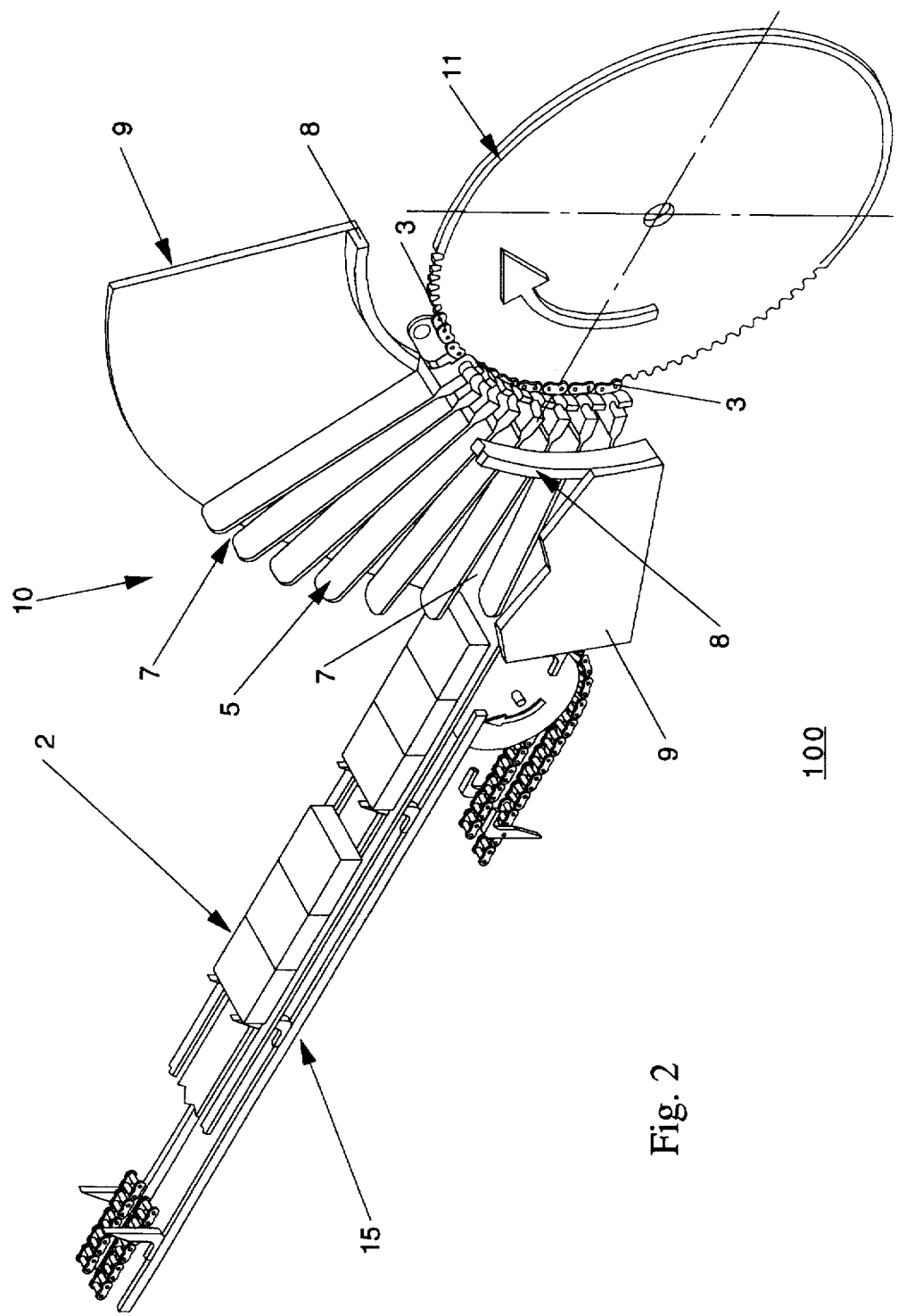
FIG. 2 is a simplified perspective view of a preferred embodiment for the loading station 10 of the present invention.

Referring now to FIG. 2 which is a simplified perspective view of the loading station 10, it can be seen that loading station 10 comprises vertical sprocket 11 rotating vertically around a horizontal shaft (not shown), which drives conveyor 3 and paddles 5. One or more product units 2 are placed into a product receptacle 7 at the loading station 10. The product is placed into the receptacle by any number of methods known in the art. An example of an apparatus for loading the products into the receptacle is a flight chain conveyor. FIG. 2 shows a partial perspective view of a suitable flight chain conveyor 15 that can be used with the apparatus of the present invention. Such flight chain conveyors are readily available in the marketplace from various companies such as the Curt G. Joa Co. Sheboygan Falls, Wis. 53085. During loading, the product units 2 are stopped by a pair of stationary rails 8 on either side of paddles 5. Rails 8 prohibit the product 2 from entering the root of the wedge between the paddles where a jam could occur later in the process. Attached to the rails 8 are side guides 9 which help stabilize and secure the product units 2 within the receptacles 7.

Single or multiple products can be loaded end-to-end in a single product receptacle 7. As shown in the figure, three product units are loaded into each product receptacle. If a product 2 is not present, the apparatus 1 stops conveyor 3 and waits until that pocket is filled before advancing on. This is called "Pad Count Correction" and it is used to insure that all pockets are filled with product and that no gaps exist in the downstream flow. "Pad count correction" is usually done by positioning an electric eye or the like at the loading station near the interface between the flight chain conveyor and the receptacles 7. If the electric eye does not detect a product unit being placed into a receptacle 7 means are provided for stopping the conveyor 3, waiting for a product to be loaded into the receptacle, and starting the conveyor back up again. Various types of methods and apparatuses are known in the art for accomplishing the "Pad Count Correction".

In a preferred embodiment product units 2 are loaded into the product receptacles 7 with the vertical axis 6 of the paddles being substantially parallel with the ground 100. After a product unit 2 is loaded into a product receptacle 7 at the loading station 10, the paddles are vertically reoriented substantially 90° along the generally circular path of sprocket 11 so that the paddles 5 are pointing upward with their vertical axis 6 substantially perpendicular with the ground 100 (as shown in FIG. 1).

Figure 3:
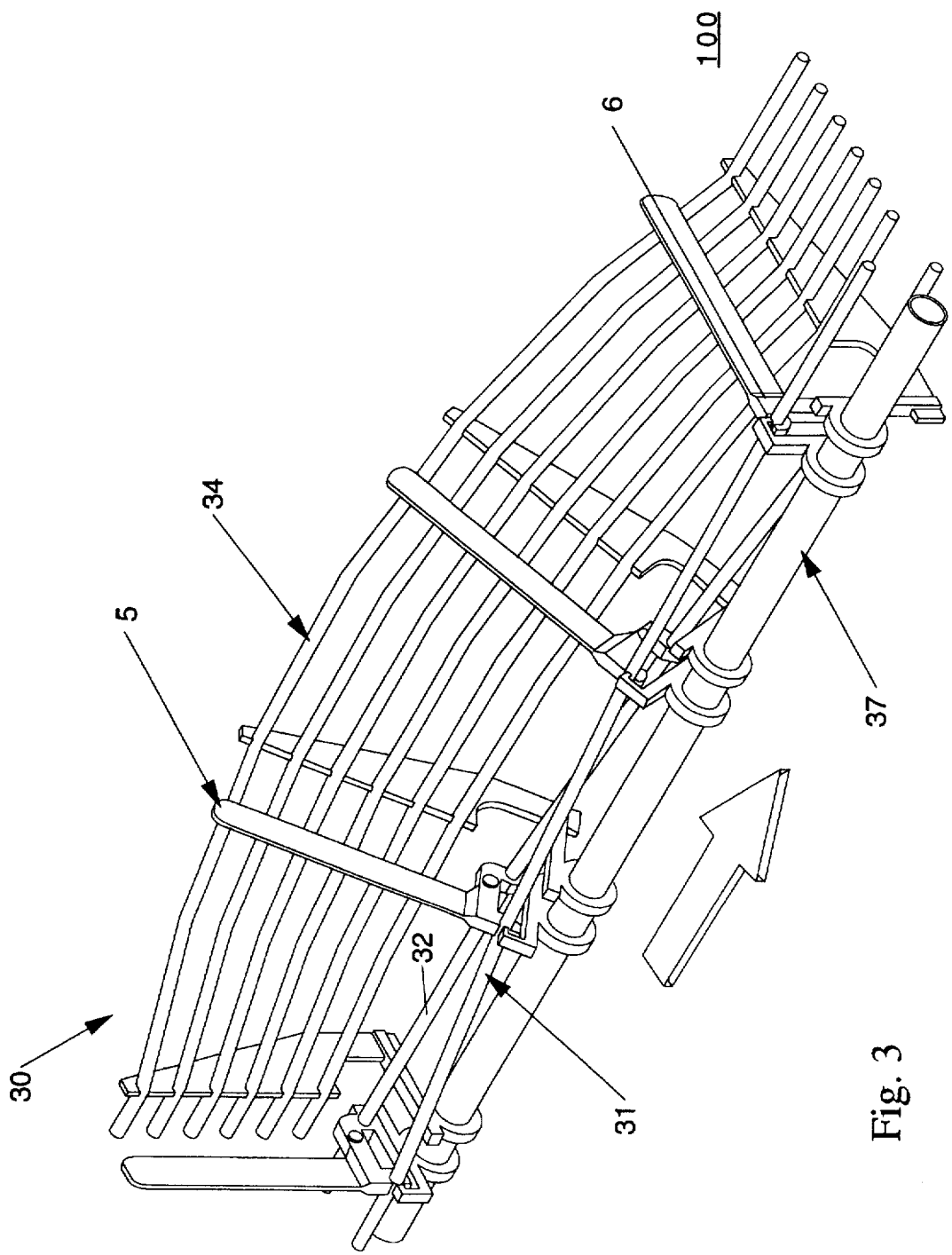
FIG. 3 is a partial simplified perspective view of a preferred means of the present invention for reorienting the paddles 5 along a helical line.

After coming off sprocket 11 the paddles engage a means 30 for reorienting the paddles along a helical line. Means 30 for reorienting the paddles along a generally helical line comprises a pair of guide rails 31,32. At point 12 guide rails 31,32 begin a counter-clockwise twist, as viewed looking downstream. The longer the twist rails are, the slower the twist is accomplished. This puts less wear on the conveyor and reduces frictional drag. However, the length of the twist rails will be limited by the amount of space available in a plant or the like. As seen from FIGS. 3 and 5, through the first means 30 for reorienting the product along a generally helical line, the product units 2 are supported and kept within receptacles 7 by a set of securing rails 34,35 that follow the path of the paddles (for clarity rail 35 is not shown in FIG. 3). After passing through guide rails 31,32 the paddles 5 are now reoriented to a desired angle with respect to the longitudinal axis of the conveyor. Typically the paddles are reoriented 90° such that their vertical axis 6 is substantially parallel to the ground 100.

As seen from FIG. 1, at the end of reorienting means 30, the paddles 5 level out and engage horizontal sprocket 33. Sprocket 33 horizontally reorients paddles 5 by turning them substantially 90° along a generally circular path. If the paddles approach sprocket 33 at an angle it is preferred that sprocket 33 is tilted at an angle so as to match the direction of the incoming paddles. Since a wedge shape is formed by product receptacles 7 as paddles 5 go around the sprocket 33, a dead plate 39 is used under paddles 5 to keep the product 2 from falling out of receptacles 7. As will be appreciated by those skilled in the art, a side securing rail can also be attached to the dead plate 39 and located just above the paddles 5 to keep the centrifugal force from pushing the product outwards toward the tips of the paddles.

From the horizontal sprocket 33, the paddles engage a second set of guide rails 36,37. Rails 36,37 guide paddles 5 to unloading station 40 where a stack of products is removed from the apparatus and sent to a packager. As seen from FIG. 4, a stationary dead plate 44 is preferably used under the paddles to ensure that the product units 2 do not fall out. As will be discussed in detail below a stack 49 of products 2 is unloaded from a plurality of product receptacles 7 at the unloading station 40.

As seen from FIG. 1, rails 36,37 continue to guide paddles 5 past unloading station 40 to a second horizontal sprocket 43. The second horizontal sprocket 43 horizontally reorients the paddles by turning them substantially 180° clockwise as viewed from overhead so that the direction of travel of paddles 5 is substantially opposite the direction of travel at the unloading station 40.

After going around sprocket 43, the paddles engage another pair of guide rails 51,52. Guide rails 51,52 provide a means 50 for reorienting the paddles to a desired angle so that the paddles can eventually return to their original position at the loading station. Rails 51,52 will typically reorient the paddles substantially 90° with respect to the longitudinal axis of conveyor 3 along a generally helical line. Reorienting means 50 which comprises twist rails 51,52 is very similar to reorienting means 30 and twist rails 31,32. No securing rails are needed here since the paddles are now empty. In the preferred embodiment, shown in the Figures, paddles 5 are now pointing downward with their vertical axis 7 substantially perpendicular to ground 100.

After passing through guide rails 51,52 paddles 5 engage turning wheel 55. Turning wheel 55 horizontally reorients paddles 5 by turning them substantially 90° along a generally circular path so that the direction of travel is changed but with the vertical axis 7 of paddles 5 still perpendicular to ground 100. In order to reduce friction, this turn is accomplished using an inside wheel 55 and a stationary outer rail 56. Inside wheel 55 is free-wheeling on bearings and rotates. Inside wheel 55 includes a means for engaging guide slot 305 on the paddles 5 while slot 306 engages outer rail 56. The rolling friction provided by wheel 55 is less than the sliding friction that would be present if the turn was accomplished by a pair of guide rails. Once paddles 5 are around wheel 55, they engage a short section of guide rails 57,58 and then continue to the infeed sprocket 11. Infeed sprocket 11 then vertically reorients the paddles substantially 90° along a generally circular path so that the paddles are flat and ready to be loaded again.

The preferred embodiment for conveyor 3 can best be described by referring to FIGS. 6 and 7. In the preferred embodiment conveyor 3 is a roller chain. An example of a suitable roller chain is a side bow roller chain #50 SB with a standard K-1 attachment 302 on every link, commercially available from Rexnord, Inc. Milwaukee, Wis. 53214. The paddles 5 are attached to the conveyor 3 by socket head cap screws extending through the holes 312 in the K-1 attachment 302 and into corresponding holes on the paddles 5.

FIGS. 6 and 7 also show a preferred embodiment for paddles 5. The overall shape of the paddle forms an "L" having short leg 303 and long leg 304. Paddles 5 can be made from any suitable material known in the art. In a preferred embodiment paddles 5 are of one piece construction, injection molded from polycarbonate. Leg 303 has grooves 305 and 306 on either side thereof for engaging the various guide rails. FIG. 5 shows how the paddles engage the guide rails.

Referring back to FIGS. 6 and 7, one can see that the paddles 5 have a raised boss 310 on one side. Boss 310 keeps the paddles from tilting towards each other. This helps to better stabilize the paddles in the straight runs, keeping them parallel with each other. Boss 310 also helps reduce friction by not allowing the paddles to cock and bind against the guide rails. In a preferred embodiment the center line of the chain rollers 301 is the same as the center line for the guide slots 305 and 306 on paddles 5. This minimizes twisting of the paddles as they are pulled along the guide rails.

In some instances, such as when conveying larger products, the paddles are on every-other link. For this embodiment a spacer block 315 can be attached to the chain between the paddles. The spacer block does not ride on the guide rails, which helps reduce friction. The block assists in securing the paddles together during the straight runs and keeps the product from falling into the gap between paddles.

In a preferred embodiment of the present invention, all of the paddle guide rails of the present embodiment 31, 32, 36, 37, 51, 52, 56, 57 and 58 comprise ½" diameter stainless steel rails. Each set of guide rails of the present invention are supported from a central spine tubes one of which is shown as 200, in FIG. 5, about which they can twist as needed. The leading ends of all of the rails are pointed so that the paddles can more easily engage them. For example when the paddles first engage rails 31,32 after coming off sprocket 11 or when the paddles first engage rails 36,37 after coming off sprocket 33, the leading edges of the rails at these locations are pointed in order to ensure the paddles smooth transition. The guide rails can be attached to the central spine tube and the spine tube can be attached to the machine frame by any number means known to those skilled in the art.

Any number of means known in the art can be used to drive conveyor 3. In a preferred embodiment, it is the infeed sprocket that is driven from a line shaft or the like in order to drive the apparatus and move conveyor 3.

UNLOADING

It is preferred that the products be loaded into receptacles 7 at the loading station 10 in a substantially continuous manner, in order to provide for a smoother operation. However, in order to facilitate unloading, especially when running at higher speeds, it is preferred that the paddles pause momentarily so that the products can be easily removed therefrom. Therefore, since the infeed is in constant motion, the pausing of the paddles must be done independently of the infeed. This is accomplished by, what is referred to in the art as "festooning". The basic concept of "festooning" is known in the art and is described, but not referred to as such, in said hereinbefore incorporated U.S. Pat. No. reference 4,399,905 which describes a stacking apparatus having a means for cyclically stopping and forwarding a portion of the flight of ways (paddles) adjacent to the outfeed station while continuously operating the flight drive to continuously forward the flight of ways through the infeed station.

The "festooning" of the present invention is accomplished by providing a means for moving the horizontal sprockets 33 and 43 back and forth or in an oscillating motion in the direction of arrow 60, shown in FIG. 1. In order to momentarily stop the motion of the paddles between the horizontal sprockets while maintaining a continuous loading process, the sprockets 33 and 43 must move opposite the flow of paddles at the same rate as the paddles are moving forward, thus causing a momentary stop of the paddle motion at the unloading station between the two horizontal sprockets 33 and 43. While the paddles are momentarily stopped, a stack of product units is unloaded by removing product units from a plurality of product receptacles. The size of the stack can be as large as the number of paddles between the sprockets 33 and 43 or can be smaller by stripping from a smaller number of paddles. After a stack of product units is unloaded, the sprockets move back to their original position travelling in the same direction as the flow of the paddles. This causes the paddles to move at twice the rate as they do at other points along the apparatus so that at the end of the festoon cycle the paddles are in the same position as if the festooning never occurred.

The twisted paddle guide rails 31 and 32 and product guide rails 34 and 35, along with their central spine tube 200 and dead plate 39, located between the infeed sprocket 11 and the horizontal sprocket 33 follows the motion of the festoon. The aforementioned rail assembly pivots around point 19 adjacent the infeed sprocket. It is preferred that the degree of pivot be minimal, preferable between about 0 degrees to about 5 degrees. This is so that at the infeed sprocket where the paddles begin to engage rails 31,32, the rails do not get out of alignment with the sprocket, which would cause the paddles not to engage the rails.

The sprockets 33 and 43 can be made to oscillate by any number of means known in the art. A preferred method of doing this is to have both sprockets ride in carriages or the like so they may traverse linearly back and forth to accomplish the festoon motion. Because sprocket 43 has twice the amount of chain wrapped around it, sprocket 33 will need to move twice the distance that sprocket 43 does. Any number of methods known in the art can be used to generate the festoon motion of the sprockets. Such methods include driving one of the sprockets with a cam or a servo motor while leaving the other sprocket free moving so as to follow the festoon motion.

In a preferred method sprocket 33 is loaded against an air cylinder, spring or other like device so that pressure is applied to the sprocket in the direction opposite the flow of the paddles. Sprocket 43 would be loaded against an air cylinder spring or other device so that pressure is applied to the sprocket in the same direction as the flow of the paddles. The difference in the forces exerted by these two air cylinders or the like keeps the distance between the two sprockets the same which keeps tension on the chain and paddles during the festoon motion so that slack in the conveyor does not develop.

Figure 4:
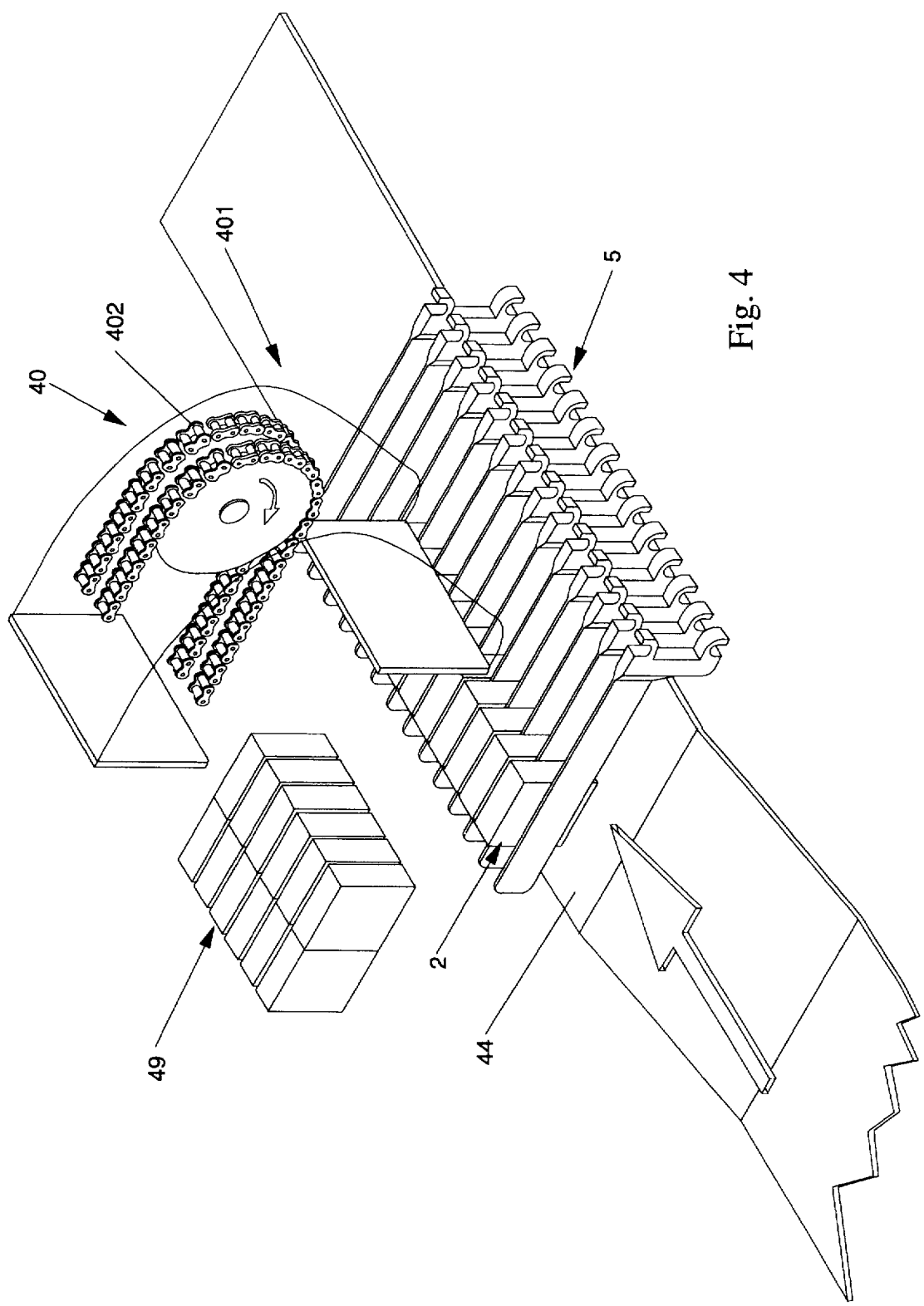
FIG. 4 is a partial simplified perspective view of a preferred embodiment for the unloading station 40 of the present invention.

As seen from FIG. 4, during the dwell, or pause, the product is swept out of the paddles by an overhead stripper conveyor 401 via chain 402. This collates the product into stacks, the size of which is governed by the stripper width and the number of products units 2 in a receptacle 7. Such paddle conveyors are well known in the art.

In order to prevent a jam during unloading, the overhead stripper sweeps across the top of the stacker paddles instead of "combing" through them. To facilitate this stripping action, a dead plate 44 is placed beneath the paddles at the unloading station. The dead plate is inclined until it is almost flush with the underside of the paddles. This forces the product up in the paddles to expose as much as possible to the overhead stripper.

While particular embodiments of the present invention have been illustrated and described, various modifications will be apparent to those skilled in the art without departing from the spirit and scope of the present invention. Accordingly, the scope of the present invention should be considered in terms of the following claims and is understood not to be limited to the details described and shown in the specification and drawings.

What is claimed is:

1. A method for stacking and conveying products, said products being conveyed on an endless conveyor from a loading station to an unloading station, said conveyor having a direction of travel extending along a longitudinal axis of said conveyor, said conveyor having a plurality of paddles extending therefrom, adjacent paddles thereby defining product receptacles therebetween, said method being such that the products are reoriented while being conveyed so that said products arrive at said unloading station with a desired orientation, said method comprising the steps of:

(a) loading at least two products into each said product receptacle and conveying said products along the longitudinal axis of said conveyor;

(b) twisting said paddles around said longitudinal axis of said conveyor to a desired orientation while they are being conveyed from said loading station to said unloading station;

(c) stacking products at said unloading station by simultaneously removing said products from a plurality of product receptacles; and (d) returning said paddles to said loading station.

2. The method of claim 1 wherein said products are loaded into said product receptacles substantially continuously.

3. The method of claim 2 wherein said stack of products is unloaded substantially intermittently.

4. The method of claim 1 further including the step of stopping said conveyor if a product is not loaded into a receptacle at said loading station and then restarting said conveyor once a product has been loaded therein.

5. A method for stacking and conveying products, said products being conveyed on an endless conveyor from a loading station to an unloading station, said products resting on a plane substantially parallel to a planar ground at said loading and unloading stations, said conveyor having a direction of travel extending along a longitudinal axis of said conveyor, said conveyor having a plurality of paddles, said paddles having a vertical axis extending perpendicularly to said longitudinal axis of said conveyor, adjacent paddles defining product receptacles therebetween, said method being such that the products are reoriented while being conveyed so that stacks of products arrive at said unloading station with the desired orientation, eliminating separate steps of conveying and then reorienting, said method comprising the steps of:

(a) loading at least two products into each said product receptacle, said products being loaded into said product receptacles, said vertical axis of said paddles at said loading station being substantially parallel with said ground;

(b) turning said paddles substantially 90° while being conveyed so that said vertical axes of said paddles are substantially perpendicular to the ground and thereafter conveying said paddles and said products along the longitudinal axis of said conveyor;

(c) twisting said paddles around said longitudinal axis of said conveyor to a desired orientation while they are being conveyed from said loading station to said unloading station;

(d) stacking products at said unloading station by simultaneously removing said products from a plurality of product receptacles; and (e) returning said paddles to said loading station.

6. The method of claim 5 wherein said products are loaded into said product receptacles substantially continuously.

7. The method of claim 6 wherein said stack of products is unloaded substantially intermittently.

8. The method of claim 5 further including the step of stopping said conveyor if a product is not loaded into each receptacle at said loading station.

9. The method of claim 5 wherein in step (b) said paddles are reoriented substantially about 90° so that said vertical axis of said paddles are substantially parallel with said ground.

10. A method for stacking and conveying products, said products being conveyed on an endless conveyor from a loading station to an unloading station, said products resting on a plane substantially parallel to a planar ground at said loading and unloading stations, said conveyor having a direction of travel extending along a longitudinal axis of said conveyor, said conveyor having a plurality of substantially equally spaced, generally planar paddles extending therefrom, the vertical axis of said paddles extending outwardly and substantially perpendicular to the longitudinal axis of said conveyor, adjacent paddles thereby defining product receptacles therebetween, said method being such that the products are reoriented while being conveyed so that stacks of products arrive at said unloading station with the desired orientation, eliminating separate steps of conveying and then reorienting, said method comprising the steps of:

(a) substantially continuously loading at least two products into each said product receptacle, said vertical axis of said paddles at said loading station being substantially parallel with said ground;

(b) turning said paddles substantially 90° so that said vertical axis of said paddles are substantially perpendicular to said ground, and thereafter conveying said products along the longitudinal axis of said conveyor;

(c) twisting said paddles around said longitudinal axis of said conveyor to a desired orientation while they are being conveyed from said loading station to said unloading station, said paddles being twisted substantially about 90° such that the vertical axes of said paddles are substantially parallel with the ground;

(d) turning said paddles substantially 90° so that said vertical axes of said paddles are substantially parallel to said ground;

(e) stacking products at said unloading station by simultaneously removing said product units from a plurality of product receptacles; and (f) returning said paddles to said loading station.

11. An apparatus for stacking and conveying products, said products being conveyed from a loading station to an unloading station, said products resting on a plane substantially parallel to a planar ground at said loading and unloading stations, said conveyor having a direction of travel extending along a longitudinal axis of said conveyor, said apparatus being such that the products are reoriented while being conveyed so that stacks of products arrive at said unloading station with the correct orientation, said apparatus comprising:

(a) an endless conveyor for conveying said products from said loading station to said unloading station, said conveyor having a direction of travel extending along a longitudinal axis of said conveyor, said conveyor comprising a twistable chain having a plurality of paddles extending therefrom, said paddles having a vertical axis substantially parallel to said ground when the paddles are conveyed past said loading and unloading stations, adjacent paddles defining product receptacles therebetween for holding said products while they are being conveyed;

(b) a means for driving said conveyor along its longitudinal axis;

(c) a means for twisting said paddies around said longitudinal axis to a desired angle while they are being conveyed from said loading station to said unloading station;

(d) a means to operate said conveyor substantially continuously at said loading station;

(e) a means to stop said conveyor if a product is not loaded into a product receptacle, and to restart said conveyor when a product is loaded therein; and (f) a means for returning said paddles to said loading station.

* * * * *

UNITED STATES PATENT AND TRADEMARK OFFICE
CERTIFICATE OF CORRECTION

PATENT NO. : 5,474,168
DATED : December 12, 1995
INVENTOR(S) : WAYNE G. LESLIE ET AL.

It is certified that error appears in the above-identified patent and that said Letters Patent is hereby corrected as shown below:

Column 10, line 39, "paddies" should read -- paddles --.

Signed and Sealed this

Seventh Day of October, 1997

Attest:

BRUCE LEHMAN

Attesting Officer    Commissioner of Patents and Trademarks